US010202535B2

(12) United States Patent
Cavo et al.

(10) Patent No.: US 10,202,535 B2
(45) Date of Patent: Feb. 12, 2019

(54) METHOD FOR TREATING SUBTERRANEAN FORMATIONS

(71) Applicant: LAMBERTI SPA, Albizzate (IT)

(72) Inventors: Enrico Cavo, Milan (IT); Lorenzo Giardini, Genoa (IT); Angelo Casiraghi, Milan (IT); Luigi Merli, Saronno (IT); Mauro Tenconi, Gazzada (IT); Pierangelo Pirovano, Comerio (IT); Giovanni Floridi, Novara (IT); Giuseppe Li Bassi, Gavirate (IT); Roberto Macchi, Solbiate Olona (IT)

(73) Assignee: LAMBERTI SPA, Albizzate (VA) (IT)

( * ) Notice: Subject to any disclaimer, the term of this patent is extended or adjusted under 35 U.S.C. 154(b) by 0 days.

(21) Appl. No.: 15/507,579

(22) PCT Filed: Aug. 6, 2015

(86) PCT No.: PCT/EP2015/068147
§ 371 (c)(1),
(2) Date: Feb. 28, 2017

(87) PCT Pub. No.: WO2016/030165
PCT Pub. Date: Mar. 3, 2016

(65) Prior Publication Data
US 2017/0247597 A1    Aug. 31, 2017

(30) Foreign Application Priority Data

Aug. 28, 2014  (IT) ................ VA2014A0024

(51) Int. Cl.
E21B 43/26    (2006.01)
C09K 8/42    (2006.01)
C09K 8/035    (2006.01)
C09K 8/68    (2006.01)
C09K 8/90    (2006.01)
C09K 8/20    (2006.01)
C09K 8/508    (2006.01)
C09K 8/512    (2006.01)

(52) U.S. Cl.
CPC ............. $C09K\ 8/428$ (2013.01); $C09K\ 8/035$ (2013.01); $C09K\ 8/20$ (2013.01); $C09K\ 8/5083$ (2013.01); $C09K\ 8/512$ (2013.01); $C09K\ 8/685$ (2013.01); $C09K\ 8/90$ (2013.01); $E21B\ 43/26$ (2013.01)

(58) Field of Classification Search
None
See application file for complete search history.

(56) References Cited

U.S. PATENT DOCUMENTS

| 4,705,825 | A | * | 11/1987 | Symes | ................... C08F 20/00 524/732 |
|---|---|---|---|---|---|
| 5,945,387 | A | * | 8/1999 | Chatterji | ................ C09K 8/518 166/285 |
| 7,858,561 | B2 | | 12/2010 | Abad et al. | |
| 7,987,912 | B2 | | 8/2011 | Robinson et al. | |
| 2010/0000735 | A1 | * | 1/2010 | Weaver | ............... C08B 37/0096 166/280.2 |
| 2010/0307757 | A1 | * | 12/2010 | Blow | .................... C09K 8/605 166/308.2 |
| 2013/0312970 | A1 | | 11/2013 | Lafitte et al. | |

FOREIGN PATENT DOCUMENTS

EP    2532682    * 12/2012

OTHER PUBLICATIONS

Shenoy, M. et al., "Synthesis and Characterization of Acryloyloxy Guar Gum," Journal of Applied Polymer Science, vol. 117, 148-154 (2010).
Tiwari, A. et al., "Biodegradable hydrogels based on novel photopolymerizable guar gum-methacrylate macromonoers for in situ fabrication of tissue engineering scaffolds," Acta Biomaterialia 5 (2009) 3441-3452.

* cited by examiner

Primary Examiner — Andrew Sue-Ako
(74) Attorney, Agent, or Firm — Mossman, Kumar & Tyler PC

(57) ABSTRACT

Method of treating a portion of a subterranean formation comprising the injection of an aqueous fluid containing a modified polysaccharide bearing ethylenically unsaturated double bonds and an initiator of radical polymerization.

20 Claims, No Drawings

METHOD FOR TREATING SUBTERRANEAN FORMATIONS

TECHNICAL FIELD

The present disclosure relates to a method of treating a portion of a subterranean formation comprising the use of an aqueous fluid containing a modified polysaccharide bearing ethylenically unsaturated double bonds and an initiator of radical polymerization that are capable of inducing the thickening of the fluid by photochemical or thermally or redox induced radical reaction between the double bonds.

The aqueous fluid is a well treatment fluid whose thickening is required for performing subterranean operations. Typically, the aqueous fluid is a fluid for hydraulic fracturing.

BACKGROUND OF THE ART

Hydraulic fracturing (fracturing) is widely used for stimulating petroleum production and recovery from subterranean formations.

It involves the injection of a suitable fluid down a well bore to reach a formation; the fluid shall be injected under sufficient pressure to extensively crack the formation and to provide passageways for the oil and gas that are contained in the pore spaces of the formation and help them flowing to the well bore. Suitable particulate materials (proppants) are often injected in the formation to prevent the closure of the fractures once pressure is released. Usually, fracturing fluids are gelled with water soluble polymers, especially with natural polymers or natural polymers derivatives, to most effectively widen the fractures and inhibit the fluid loss.

To provide a gelled fracturing fluid, these water soluble polymers shall be previously dissolved in the aqueous component of the fluid and then gelled with a crosslinking composition which is generally based on titanium, zirconium, aluminum or boron salts.

Most often, boron salts are the crosslinking compositions of choice because of their low cost and efficiency.

Nonetheless, the release of boron salts in the environment tends to be discouraged because, unfortunately, boric acid derivatives revealed to be toxic for reproduction.

Moreover, boron salts cannot be used above 150° C., because above this temperature their gels are unstable. At higher temperature, expensive and pH sensitive zirconium salts shall be used.

Therefore, it would be highly desirable to provide a gelling composition for aqueous based fracturing fluids which is devoid of boron salts, utilizable in a wide range of pH and temperature, is cheap and little sensitive to salts. From U.S. Pat. No. 7,987,912 (Schlumberger Techn. Corp.), a viscosifier for oilfield fluids is known that is the combination of a polymer and crosslinking agents that undergoes the Diels Alder reversible reaction to form a gel. The thermal conditions at the subterranean location should favour both the forward reaction (gelling) and reverse reaction (breaking). The critical temperatures of the forward and reverse reaction can be tuned with various methods, such as adding a competitive compounds or a catalyst.

U.S. Pat. No. 7,858,561 (Schlumberger Techn. Corp.) describes a viscosifying agent for wellbore fluids including a polymer polymerized using at least two pre-polymers "A" and "B", the polymer being capable of essentially fully degrading into soluble fragments; the synthesis of an A-B polymer obtained by radically grafting a diethylenically unsaturated polymeric compound (B) on a low molecular weight non-modified guar(A) in solution is there reported.

US 2013/0312970 (Schlumberger Techn. Corp) discloses a method for viscosifying aqueous fluids by using polymers that undergo crosslinking in the presence of functionalized nanoparticles. In one embodiment, the functionalized nanoparticles bear boronic acid groups and the polymer is guar. The method is said to allow minimizing the use of boron with a low concentration of the polymer.

Synthesis of double bond modified polysaccharides and crosslinking of double bond modified polysaccharides are also known in the literature.

By way of example, the aim of the study published in J. of App. Polym. Sci. 117, 148-154 (2010) is to synthesize an acryloyloxy guar gum via a Schotten-Baumann reaction in aqueous media. The reaction products were characterized using FTIR, $^{13}$C-NMR, wide angle X-ray diffraction techniques to ascertain the effect of acrylation on the structure of guar gum. The acrylation of guar gum was found to be limited to the primary hydroxyl groups on the guar gum molecule. The maximum degree of substitution (DS) was found to be 0.56, which was observed after 3 h of reaction.

In Acta Biomaterialia 5, 3441-3452 (2009) it is reported that very low molecular weight guar gum was modified with glycidyl methacrylate (GMA) in aqueous solution to produce a series of water-soluble photopolymerizable guar gum-methacrylate (GG-MA) macromonomers of different molecular weights. The effects of the molecular weight of the GG-MA macromonomers and of the degree of methacrylation on the properties of GG-MA hydrogels were studied.

EP 2532682 (BASF) describes a process for the preparation of polysaccharide esters of ethylenically unsaturated acids. The esterification of polysaccharides is performed under anhydrous or semi anhydrous conditions by heating homogenised mixtures of polysaccharides and acidic monomers. Double bond modified polysaccharides and crosslinking of double bond modified polysaccharides have found some practical use is the preparation of medical gels (tissue engineering and drug delivery).

It has now been found that it is possible to thicken aqueous fluids for well treatments by addition of double bond modified polysaccharides and a radical polymerization initiator, possibly in the presence of other polyethylenically unsaturated compounds. The thickening is believed to be induced by radical self-crosslinking of the modified polysaccharides or by the radical crosslinking of the modified polysaccharides and the other ethylenically unsaturated compounds.

By "self-crosslinking" we mean the formation of covalent bonds between different polymeric chains of the modified polysaccharides.

By "crosslinking" we mean the formation of covalent bonds between at least one polymeric chain of a modified polysaccharides and at least another polyethylenically unsaturated compound (crosslinker).

The basic structure of the polysaccharide is not altered by the double bond formation and therefore the thickening of the aqueous fluid may be reversed by the breakers that are normally used in the field.

SUMMARY OF THE INVENTION

In one aspect, the disclosure relates to a method of treating a portion of a subterranean formation comprising the following steps:

i. providing an aqueous fluid containing:
a) from about 0.05% to about 3.0% by weight of a modified polysaccharide, the modified polysaccharide being a polysaccharide bearing ethylenically unsaturated double bonds, with double bond degree of substitution ($DS_{DB}$) from 0.0001 to 0.5;
b) from 0 to about 3.0% by weight of a polyethylenically unsaturated compound different from the modified polysaccharide a);
c) from about 0.0001% to about 1% by weight of a radical polymerization initiator chosen among photoinitiators and thermal or redox free radical initiators;
ii. placing the aqueous fluid into a portion of a subterranean formation;
iii. before or after having placed the aqueous fluid into a portion of a subterranean formation, inducing the thickening of the aqueous fluid by exposing the fluid to UV-visible light irradiation or to heat.

DETAILED DESCRIPTION OF THE INVENTION a) The Modified Polysaccharide.

By "modified polysaccharide" we mean a polysaccharide, or a derivative thereof, bearing ethylenically unsaturated double bonds.

"Modified", when referred to polysaccharides or derivatives thereof, means "bearing ethylenically unsaturated double bonds".

Examples of polysaccharides and derivatives thereof that can be used to prepare the modified polysaccharide are polygalactomannans, such as guar gum (guar), locust bean gum, *cassia* gum, fenugreek gum, tara gum, *sesbania* gum; polygalactomannan derivatives, such as hydroxyalkyl polygalactomannans, carboxyalkyl polygalactomannans, carboxyalkyl hydroxyalkyl polygalactomannans or hydrophobized polygalactomannan derivatives, and especially hydroxyalkyl guar, carboxyalkyl guar, carboxyalkyl hydroxyalkyl guar, hydrophobized guar, hydrophobized hydroxyalkyl guar, hydrophobized carboxyalkyl guar, hydrophobized carboxyalkyl hydroxyalkyl guar; pectin; alginates; tamarind gum and derivatives thereof, such as carboxyalkyl tamarind and hydroxyalkyl tamarind; konjac gum, gum arabic; gum ghatti; carrageenan; cellulose ethers, such as hydroxyalkyl cellulose, carboxyalkyl hydroxyalkyl cellulose, carboxyalkyl cellulose, hydrophobized hydroxyalkyl cellulose, alkyl hydroxyalkyl cellulose, hydrophobized carboxyalkyl hydroxyalkyl cellulose, hydrophobized carboxyalkyl cellulose, hydrophobized hydroxyalkyl alkyl cellulose; starch; starch derivatives; gum tragacanth; gum karaya; xanthan gum; welan gum; succinoglucans; mixtures thereof.

For the purpose of the present disclosure, modified polygalactomannans, modified polygalactomannans derivatives and modified cellulose ethers are the preferred modified polysaccharides that can be used in the method of the invention. Modified polygalactomannans are the most preferred modified polysaccharides.

Polygalactomannans are commercially available polysaccharides mainly composed of galactose and mannose units obtained from the endosperm of leguminous seeds. Polygalactomannans suitable for the method of the invention may be extracted, for example, from *Trigonella foenum-graecum* (fenugreek gum), *Cyamopsis tetragonoloba* (guar gum), *Sesbania Bispinosa* and *Sesbania aculeate* (*sesbania* gum), *Cesalpinia spinosa* (tara gum), *Ceratonia siliqua* (locust bean gum or carob gum), *Cassia tora* and *Cassia obtusifolia* (*cassia* gum).

These polygalactomannans differ from one another in the mannose-to-galactose ratio. In order of increasing ratio, fenugreek gum has a mannose:galactose ratio about 1:1; guar gum and *sesbania* gum about 2:1, tara gum about 3:1, locust bean gum or carob gum about 4:1 and *cassia* gum about 5:1.

Polygalactomannans derivatives and cellulose ethers with various degrees of substitution and molecular weights are also commercially available.

Among the polygalactomannans useful for the preparation of the modified polysaccharide, guar is particularly preferred; among the polygalactomannans derivatives, hydroxypropyl guar, carboxymethyl guar, carboxymethyl hydroxypropyl guar, hydrophobized hydroxypropyl guar, hydrophobized carboxymethyl guar and hydrophobized carboxymethyl hydroxypropyl guar are particularly preferred, and hydroxypropyl guar more particularly; carboxymethyl cellulose is the preferred cellulose ether. Various synthetic methods can be used to prepare the modified polysaccharide.

By way of example, the starting polysaccharide or derivative thereof can be esterified by reaction with an unsaturated acyl halide, or anhydride, or ester, or acid, or epoxide bearing an ethylenically unsaturated double bond; or it can be reacted with an unsaturated silane.

Preferably, the polysaccharide or derivative thereof is modified by reaction with an unsaturated acyl halide, or anhydride, or ester, or acid, or epoxide bearing an ethylenically unsaturated double bond.

The unsaturated silane that can be used has typically the general formula $R_1R_2R_3R_4Si$, where at least one, and preferably one, of $R_1$, $R_2$, $R_3$, $R_4$ is an ethylenically unsaturated residue and at least one, and preferably one, of $R_1$, $R_2$, $R_3$, $R_4$ is a halogen or an alkyloxy residue.

examples of suitable silanes are: 3-butenyl methyl dichlorosilane, allyl dichlorosilane, allyl dimethyl chlorosilane, allyl methyl dichlorosilane, allyl trichlorosilane, vinyl(chloromethyl) dimethoxy silane, dimethyl vinyl chlorosilane, vinyl methyl dichlorosilane, vinyl trichlorosilane, diallyl dichlorosilane, trivinyl chlorosilane, divinyl dichlorosilane, 3-(acryloxipropil)trichlorosilane, 3-(acryloxipropil)methyl dichlorosilane, methacryloxy propilmethyl dichlorosilane, methacryloxy propilmethyl dimethyl chlorosilane, methacryloxy propil trichlorosilane, 3-acrylamidopropyltrimethoxysilane, n-(3-acryloxy-2-hydroxypropyl)-3-aminopropyltriethoxysilane, (acryloxymethyl) phenethyltrimethoxysilane, acryloxymethyltrimethoxysilane, (3-acryloxypropyl)dimethylmethoxysilane, (3-acryloxypropyl)methyldichlorosilane, (3-acryloxypropyl)methyldiethoxysilane, (3-acryloxypropyl)methyldimethoxysilane, (3-acryloxypropyl) trimethoxysilane, allyl(3-chloropropyl)dichlorosilane, 3-(n-allylamino)propyltrimethoxysilane, allyldimethoxysilane, allylmethyldichlorosilane, allylmethyldimethoxysilane, 11-allyloxyundecyltrimethoxysilane, allylphenyldichlorosilane, m-allylphenylpropyltriethoxysilane, allyltriethoxysilane, allyltrimethoxysilane, (e)-2-butenyltrichlorosilane, z)-2-butenyltrichlorosilane, 3-butenyltriethoxysilane, 2-(chloromethyl)allyltrichlorosilane, 2-(chloromethyl)allyltrimethoxysilane, 2-(divinylmethylsilyl)ethyltriethoxysilane, 5-hexenyldimethylchlorosilane, 5-hexenyltrichlorosilane, 5-hexenyltriethoxysilane, (3-methacrylamidopropyl) triethoxysilane, n-(3-methacryloxy-2-hydroxypropyl)-3-aminopropyltriethoxysilane, (methacryloxymethyl) dimethylethoxysilane, (methacryloxymethyl)

methyldiethoxysilane, (methacryloxymethyl)methyldimethoxysilane, methacryloxymethyltriethoxysilane, methacryloxymethyltrimethoxysilane, methacryloxypropyldimethylethoxysilane, methacryloxypropyldimethylmethoxysilane, methacryloxypropylmethyldiethoxysilane, methacryloxypropylmethyldimethoxysilane, methacryloxypropyltriethoxysilane, methacryloxypropyltrimethoxysilane, 7-octenyldimethylchlorosilane, 7-octenyltrichlorosilane, 7-octenyltrimethoxysilane, 1-propenylmethyldichlorosilane, trivinylethoxysilane, trivinylmethoxysilane, 10-undecenyldimethylchlorosilane, 10-undecenyltrichlorosilane, 10-undecenyltrimethoxysilane, vinyl(chloromethyl)dimethoxysilane, vinyldimethylethoxysilane, vinylmethyldiethoxysilane, vinylmethyldimethoxysilane, vinyloctyldichlorosilane, vinyltriethoxysilane, vinyltrimethoxysilane.

The unsaturated acyl halide, or anhydride, or ester, or acid, or epoxide is preferably selected among (meth)acryloyl chloride, (meth)acrylic anhydride, crotonyl chloride, maleic anhydride, glycidyl methacrylate, 3-chloro-2-hydroxypropyl methacrylate; most preferably is (meth)acrylic anhydride. The preferred unsaturated silane is dimethyl vinyl chloro silane.

The polysaccharide or derivative thereof may be partially depolymerised before or after the modification reaction, according to methods that are well known in the art.

The modification reaction of the polysaccharide or derivative thereof may be carried out in solution, the polysaccharide or derivative thereof being dissolved in water, or in paste or in slurry, in the presence of a liquid medium.

When the modification reaction is carried out in slurry or in paste, the liquid medium is usually water or a mixture of water and organic solvent, typically isopropyl alcohol, methyl ethyl ketone, acetone or toluene.

By "in paste" we mean that the liquid medium/polysaccharide weight ratio in the reaction mixture is less than 3:1.

By "in slurry" we mean that the liquid medium/polysaccharide weight ratio in the reaction mixture is higher than 3:1, typically higher than 5:1.

The modification reaction is preferably performed in paste or in slurry. Most preferably the reaction is performed in paste, because the modified polysaccharide is typically in solid form and working in paste avoids the need of removing and recycling large amounts of solvents.

To activate the polysaccharide for the modification reaction a base is normally used. Aqueous solutions of alkali metal hydroxides (such as sodium hydroxide or potassium hydroxide) in about stoichiometric amounts on the modifying agent are typically used, but other inorganic or organic bases (such as organic amines) may be used.

The modification reaction may also be catalysed by acids or phase transfer agents, by way of example by the addition of tetralkylammonium halides.

The acidic conditions taught by EP 2532682 may also be used.

The reaction may also be accelerated by applying pressure and heating.

In the modification reaction, temperatures above 150° C. should be avoided to prevent excessive degradation of the polysaccharide.

The modification reaction usually takes place at temperature between about −10° C. and up to 150° C., for 30 minutes to 6 hours or more, depending on the reactivity of the polysaccharide and of the reactant, as the skilled in the art may easily determine.

The modified polysaccharide shall bear in the average from about 0.0001 to about 0.5 ethylenically unsaturated double bonds per glycosyl unit (i.e. a double bond degree of substitution, $DS_{DB}$, from about 0.0001 to about 0.5), as measured by $^1$H-NMR or other suitable analytical method.

Preferably the modified polysaccharide has a $DS_{DB}$ from 0.0005 to 0.1, more preferably from 0.001 to 0.03; most preferably the modified polysaccharide has a $DS_{DB}$ from 0.01 to 0.03.

Most preferably the ethylenically unsaturated double bonds of the modified polysaccharide are unconjugated, that is the polysaccharide is modified by reaction with a compound comprising only one carbon-carbon double bond. In the preferred embodiments, the modified polysaccharide is guar (meth)acrylate, guar glycidyl(meth)acrylate (guar-GMA), hydroxypropyl guar glycidyl(meth)acrylate (HPG-GMA), guar maleate, guar crotonate, carboxymethyl cellulose (meth)acrylate.

According to a particularly advantageous embodiment of the invention, the modified polysaccharide is guar (meth)acrylate.

To enhance the dispersibility and accelerate the dissolution of the modified polysaccharide in the aqueous fluids, the modified polysaccharide may be treated with small amounts of crosslinking agents, such as metal salts or glyoxal, as it is known in the art.

From about 0.05 to about 3% by weight (wt %), preferably from about 0.1 to about 1 wt %, of the modified polysaccharide are contained in the aqueous fluid.

Typically, one polysaccharide is used in the method of the invention, but two or more different modified polysaccharides may also be used.

b) The Polyethylenically Unsaturated Compound (Crosslinker).

The polyethylenically unsaturated compound, or crosslinker, can be any of the known synthetic polyfunctional unsaturated compounds whose double bonds can undergo radical polymerization reaction.

Among the useful polyethylenically unsaturated compounds we cite diallyl maleate, allyl methacrylate, diallyl phthalate, methylenebisacrylamide (or N,N'-methylenebisacrylamide), trimethylolpropane triacrylate, trimethylolpropane di- or tri-allyl ether, pentaerithritol ether polyacrylates, triallyl cianurate, and the like.

Polymeric polyfunctional compounds, such as polyethylene glycol di(meth)acrylates, ethoxylated pentaerithritol polyacrylates, ethoxylated glycerine polyacrylate, ethoxylated polyglycerol polyacrylate, trimethylolpropane ethoxylated triacrylate, hyperbranched polyacrylated polymers, may also be used.

The polyethylenically unsaturated compound is preferably soluble in water. According to a particularly advantageous embodiment, the polyethylenically unsaturated compound is methylenebisacrylamide (MBA).

From 0 to about 3 wt %, preferably from about 0.01 to about 1 wt %, most preferably from about 0.05 to about 0.5 wt %, of the polyethylenically unsaturated compound is contained in the aqueous fluid.

Two or more different polyethylenically unsaturated compounds may be used in step i.

Preferably one polyethylenically unsaturated compound is used in step i.

c) The Radical Polymerization Initiator.

The radical polymerization initiator may be a photoinitiator (c1) or a thermal or redox free radical initiator (c2).

c1) The Photoinitiator

Photoinitiators are well known chemical compounds that initiate the radical polymerization of unsaturated monomers when exposed to UV-Visibile (UV-Vis) radiation by the formation of free radicals. They are commercially available compounds used in UV-Vis curable compositions, such as UV curable inkjet inks and coatings.

Two types of radical photoinitiators can be used in the method of the invention: Norrish Type I and Norrish Type II photoinitiators.

A Norrish Type I photoinitiator is an initiator which cleaves after excitation, yielding the initiating radical immediately. A Norrish Type II-initiator is a photoinitiator which is activated by UV-Vis radiation and forms free radicals by hydrogen abstraction from a second compound that becomes the actual initiating free radical.

Norrish Type II photoinitiators always require a co-initiator; aliphatic amines or aromatic amines, alcohols and thiols are preferred examples of co-initiators. After transfer of a hydrogen atom to the Norrish Type II initiator, the radical generated on the co-initiator initiates the polymerization.

When Norrish Type II photoinitiators are used in the gelling composition, the gelling composition also contains a suitable co-initiator.

The photoinitiator may be a monofunctional compound or a multifunctional compound having more than one photoinitiating group.

Suitable Norrish Type I photoinitiators that can be used are benzoin derivatives, methylolbenzoin and 4-benzoyl-1, 3-dioxolane derivatives, α,α-dialkoxyacetophenones, α-hydroxyketones, α-aminoketones, benzil ketals, acylphosphine oxides, bisacylphosphine oxides, acylphosphine sulphides, halogenated acetophenone derivatives, ketosulfones, triazines and combinations of these photoinitiators; specific examples of suitable Norrish Type I photoinitiators are: 2-hydroxy-4'-(2-hydroxyethoxy)-2-methyl propiophenone, benzildimethyl ketal or 2,2-dimethoxy-1,2-diphenylethanone, 1-hydroxy-cyclohexyl-phenyl ketone, 2-hydroxy-2-methyl-1-phenylpropan-1-one, 2-methyl-1-[4-(methylthio)phenyl]-2-morpholino propan-1-one, 2-benzyl-2-dimethylamino-1-(4-morpholino phenyl)-butan-1-one, poly {2-hydroxy-2-methyl-1-[4-(1-methylvinyl) phenyl] propan-1-one}, blend of poly {2-hydroxy-2-methyl-1-[4-(1-methylvinyl)phenyl]propan-1-one} and 2-hydroxy-2-methyl-1-phenyl-propan-1-one, blend of poly {2-hydroxy-2-methyl-1-[4-(1-methylvinyl)phenyl]propan-1-one}, 2,4,6-trimethylbenzoyl diphenyl-phosphine oxide, 1-[4-[(4-benzoyl-phenyl)-thio]-phenyl]-2-methyl-2-[(4-methyl-phenyl)-sulfonyl]-propan-1-one, acylphosphine oxides such as 2,4,6-trimethylbenzoyl diphenyl phosphine oxide, bis(2, 4,6-trimethylbenzoyl)-phenyl-phosphine-oxide, blend of bis (2,6-dimethoxybenzoyl)2,4,4-trimethyl-pentyl phosphine oxide and 2-hydroxy-2-methyl-1-phenyl-propan-1-one, 4-(2-hydroxy-2-methyl-propionyl) benzoic acid (LFC1958) or a salt thereof, 1-[4-(2-(N,N-diethanolamine)ethoxy)phenyl]-2-hydroxy-2-methyl propan-1-one or a salt thereof, 2-[2-[4-(2-hydroxy-2-methyl-propionyl)-phenoxy]-ethoxy]-acetic acid or a salt thereof, 2-[4-(2-hydroxy-2-methyl-propionyl)-phenoxy]-acetic acid (LFC3379) or a salt thereof, and the like. Examples of Norrish Type II photoinitiators that can be used include aromatic ketones such as benzophenone, xanthone, derivatives of benzophenone (e.g. chlorobenzophenone), blends of benzophenone and benzophenone derivatives (e.g. a 50/50 blend of 4-methyl-benzophenone and benzophenone), Michler's Ketone, Ethyl Michler's Ketone, thioxanthone and thioxanthone derivatives like isopropyl thioxanthone, anthraquinones (e.g. 2-ethyl anthraquinone), coumarin, or chemical derivatives or combinations of these photoinitiators. Suitable co-initiators include, but are not limited to, aliphatic, cycloaliphatic, aromatic, aryl-aliphatic, heterocyclic, oligomeric or polymeric amines.

Also mixtures of both Norrish types of radical photoinitiators can be used. The preferred photoinitiators are water-soluble photoinitiators or water-dispersible photoinitiators, or photoinitiators that are modified to become water-soluble or water-dispersible.

The most preferred photoinitiators contained in the gelling composition belong to the class of water soluble α-hydroxyketones, and in particular are 4-(2-hydroxy-2-methyl-propionyl) benzoic acid (LFC1958) or a salt thereof, 1-[4-(2-(N,N-diethanolamine)ethoxy)phenyl]-2-hydroxy-2-methyl propan-1-one or a salt thereof, 2-[2-[4-(2-hydroxy-2-methyl-propionyl)-phenoxy]-ethoxy]-acetic acid or a salt thereof or 2-[4-(2-hydroxy-2-methyl-propionyl)-phenoxy]-acetic acid (LFC3379) or a salt thereof.

The aqueous fluid may comprise from about 0.0001 to about 1 wt %, preferably from about 0.0001 to about 0.02 wt % of photoinitiator.

c2) the Thermal or Redox Free Radical Initiator

Thermal or redox free radical initiators may be used in alternative to photoinitiators to induce thickening of the aqueous fluid.

Conventional thermal free radical initiators may be used, such as hydrogen peroxide, t-butyl hydroperoxide, t-amyl hydroperoxide, alkali or ammonium persulfates, sodium, potassium or ammonium sulfite, sodium, potassium or ammonium bisulfite and sodium, potassium or ammonium metabisulfate, azo initiators, typically at a level from about 0.0001% to about 1% by weight, preferably from about 0.01% to about 0.3% by weight, based on the weight of the aqueous fluid.

Particularly useful free radical initiator is are sodium sulfite, sodium bisulfite and sodium metabisulfite that induce the thickening of the aqueous fluid at temperature from about 25° C. to about 50° C. at pH<7.

When using free radical initiators operating at acidic pH, in order to further stabilize the gel at temperature above 120° C., it may be advisable to enhance the pH of the aqueous fluid after the gel formation, by adding to the aqueous fluid a compound that slowly raises its pH, such as hard-burned magnesium oxide or other retarded or encapsulated alkalis.

Redox initiators, i.e. redox systems (or redox couples) using the free radical initiators coupled with a suitable reductant, such as, for example, sodium sulfoxylate formaldehyde, sodium hydrosulfite, isoascorbic acid, hydroxylamine sulfate and sodium bisulfite may be used at similar levels, optionally in combination with metal ions such as, for example iron and copper, optionally further including complexing agents for the metal, and also in combination with enzymes, such as peroxidases.

The activation temperature of the thermal or redox free radical initiator may vary from ambient temperature to about 150° C., depending on the choice of the initiator.

The preferred components c) in the aqueous fluid are thermal or redox free radical polymerization initiators, and especially water soluble thermal azoinitiators, 4,4'-azobis(4-cyanopentanoic acid), dihydrochloride 2,2'-azobis(2-10 methylpropionamidine)dihydrochloride (V-50) and 2,2'-azobisisobutyronitrile (AIBN).

The aqueous fluid comprises from about 0.0001 wt % to about 1 wt %, preferably from about 0.01 wt % to about 0.3 wt % of thermal or redox free radical initiator.

The Preparation of the Aqueous Fluid and its Thickening.

The components a) to c) detailed above, neat or dispersed or dissolved in a suitable medium, may be added separately to the aqueous fluid, or as a pre-mixed thickening composition comprising the components a) to c), typically right before injection of the fluid downhole and usually under vigorous stirring, in order to properly mix the components and hydrate the modified polysaccharide.

The pre-mixed thickening composition may be prepared by mixing its neat components from a) to c) in a tank, to obtain the thickening composition, typically in powder form, or by dispersing them in an inert liquid, typically a mineral oil, diesel oil, glycol or glycol ether, to obtain the thickening composition dispersed in a liquid, preferably at concentration of at least about 15 wt %.

Alternatively, two of the components from a) to c) can be mixed together, neat or dispersed in a liquid as described above, and added as a mixture to the aqueous fluid, and the third component is possibly added separately to the fluid.

The thickening, or gelation (which is here meant to be a particular kind of thickening), of the aqueous fluid is induced by irradiating it with UV-visible light at a wavelength within the ultraviolet and visible spectral range (180-700 nm) in case the initiator c) is a photoinitiator; thickening, or gelation, occurs spontaneously or by applying heat in case the initiator c) is a thermal or redox free radical initiator.

The wavelength or wavelength range to be employed may vary depending on the nature of the radical photoinitiator but, preferably, it lies within the range from about 260 to 400 nm. Suitable sources of radiation include mercury, xenon, carbon arc and tungsten filament lamps, led, sunlight. More specifically, rays from a high-pressure mercury lamp (400 W), for instance, can be used for the irradiation, with rays shorter in wavelength than 260-270 nm being cut off.

Irradiation may last from about some second to hours, depending upon the amounts of modified polysaccharide, the photoinitiator being utilized and its concentration, the radiation source, the distance of the fluid from the source and the transparency of the fluid to be treated.

Irradiation can be applied directly to the aqueous fluid briefly before its injection downhole, or downhole, in case the well can be equipped with the lamps.

Activating the thermal or redox free radical initiator usually requires some heat, which may be furnished by the subterranean environment or by external heating. In some cases, and depending on the radical initiator which is used, ambient heat at is sufficient to induce thickening, that spontaneously occurs soon after the modified polysaccharide and the radical initiator have been placed in the fluid.

The thickening of the fluid may thus take place soon after the modified polysaccharide has been hydrated in the aqueous fluid, right before placing the aqueous fluid into the subterranean formation or, more commonly, after having injected the aqueous fluid into the subterranean formation.

According to a specific embodiment of the present invention the aqueous fluid is an aqueous fracturing fluid and the method includes fracturing of at least a portion of the subterranean formation.

The aqueous fracturing fluid, beside the components from a) to c), contains the normally used additives, well known to those skilled in the art, such as proppants and gel breakers (or breakers).

Useful gel breakers include, but are not limited to, ammonium persulfate, sodium persulfate, sodium bromate and sodium chlorite, enzymes and combination thereof. Preferably, the gel breaker is a delayed gel breaker, such as encapsulated ammonium persulfate. A delayed gel breaker slowly releases the oxidizer from the polymer coating to enable a strong initial gel to carry and to deposit the proppant in the formation.

The fluid also typically includes one or more proppants suspended in the fluid.

Useful proppants include, but are not limited to, gravel, sand, resin coated sand, ceramic beads, bauxite, glass, glass beads and mixtures thereof.

The aqueous fracturing fluid also optionally includes one or more buffers. Useful buffers include, but are not limited to, potassium carbonate, sodium carbonate, sodium sesquicarbonate, potassium bicarbonate, sodium bicarbonate, potassium hydroxide, sodium hydroxide and mixtures thereof. The buffer may be added to the fluid prior to adding the crosslinking composition.

The aqueous fracturing fluid of the disclosure may optionally include one or more conventional additives that do not adversely affect the performance of the well treatment fluid. Such additives include, but are not limited to, fibers, clay stabilizers, gel stabilizers, surfactants, bactericides and the like. Generally the aqueous fracturing fluids of the invention have a viscosity of above about 50 mPa·s at 100 sec$^{-1}$, and, more preferably, above about 100 mPa·s at 100 sec$^{-1}$.

The aqueous component of the fracturing fluid may be selected from fresh water, salt water, seawater, natural or synthetic brine, mixtures of water and water soluble organic compounds, any other aqueous liquid that does not interact with the other components of the well treatment fluid to adversely affect its performance, and mixtures thereof.

In a particular embodiment, the aqueous component of the fracturing fluid is a produced oilfield water (or production water), i.e. saline water or brine that accompany the extraction of an oil and gas from underground reservoirs. According to an advantageous embodiment of the disclosure, the use of a photoinitiator, or a free radical initiator, that is able to induce thickening of the fracturing fluid at pH≤8 consents to practice the method of the disclosure with aqueous fluids comprising production waters that contain relevant amount of salts forming insoluble carbonates, sulphates and hydroxides at pH>8; such aqueous fluids cannot be used in traditional boron based fracturing fluids that need pH of about 9-10 to be gelled. According to the prior art methods, to diminish the amount of insoluble salts, the pH of the fracturing fluid could be lowered to about 8 by using zirconium salts as crosslinker, that are effective even at this pH; unfortunately, by using zirconium salts, the choice of compatible antiscale agents is severely restricted, because many of them, bearing phosphonate functionalities, chelate and deactivate the crosslinker.

Accordingly, in the method of the invention, the pH of the aqueous fluid may be equal or below 8, preferably equal or below 7, the aqueous fluid may comprise a saline production water and the radical polymerization initiator is a photoinitiator, or is chosen among alkali or ammonium sulfite, alkali or ammonium bisulfite and alkali or ammonium metabisulfite; in this embodiments, the radical polymerization initiator is preferably chosen among sodium sulfite, sodium bisulfite and sodium metabisulfite.

In the method of the disclosure, the aqueous fluid is finally pumped or injected into the subterranean formation (step ii.). When the treatment fluid is a fracturing fluid, the fluid is typically pumped or injected at a pressure sufficient to fracture the formation (e.g., to generate a plurality of fractures), and thus to enable the particulate solid (proppant) suspended in the well treatment fluid to be carried into the fractures by the fluid and deposited in them.

In other embodiments of the invention the method of the invention is used to treat a well by the use of the thickened aqueous fluid that performs subterranean operations such as drilling operations, lost circulation operations, sand control operations, lost circulation operations, stimulation operations, completion operations, acidizing operations, scale inhibiting operations, water-blocking operations, clay stabilizer operations, gravel packing operations, wellbore strengthening operations, enhanced oil recovery operations, fluid diverting operations, and sag control operations. More specifically, the aqueous fluid may be used in well treatment fluids to control fluid loss.

EXAMPLES

In the here below preparations and tests, unless otherwise defined, percentages are by weight (wt).
Preparation of the Modified Polysaccharides
Preparation 1—HPG-GMA (Sample 1A)

50 g of hydroxypropyl guar having molar substitution (MS) of 0.5 were mixed with a 11.3 g of water, 1.0 g of sodium hydroxide (30% by weight) and 12.5 g of isopropyl alcohol in a glass reactor for 20 minutes at room temperature. Then, a mixture of 7.5 g of glycidyl methacrylate (GMA) and 10 g of isopropyl alcohol was added in the reactor and stirred at 70° C. for 2 hours. 0.5 g of phosphoric acid (75% by weight) were added in the reactor to obtain a product with pH 7. The product obtained has been washed with 500 ml of acetone (sample 1A).

5 g of sample 1A were dissolved in DI water and purified by dialysis (Molecular Weight Cut Off (MWCO): 12-14 kDa), freeze dried and analyzed by 1H-NMR, showing a DS of 0.052.
Preparation 2—HPG-GMA (Samples 2A and 2B)

600 g of hydroxypropyl guar having molar substitution (MS) of 0.5 were mixed with a 136 g of water, 30 g of sodium hydroxide (30% by weight) and 150 g of isopropyl alcohol in a horizontal reactor for 20 minutes at room temperature.

Then, a mixture of 60 g of glycidyl methacrylate (GMA) and 120 g of isopropyl alcohol was added in the reactor and stirred at 70° C. for 2 hours. 5.8 g of phosphoric acid (75% by weight) were added in the reactor to obtain a product with pH 7.

The product obtained was dried and milled to 100 mesh (sample 2A).

300 g of sample 2A have been washed with 1 L of acetone and then dried and milled (sample 2B)

5 g of sample 2B have been dissolved in DI water and purified by dialysis (MWCO 12-14 kDa), freeze dried and analyzed by 1H-NMR, showing a DS of 0.014.
Preparation 3—Guar Methacrylate (Sample 3A)

20 g of native guar gum powder were mixed with 150 ml of methyl ethyl ketone, 150 ml of demineralized water and 9.8 g of sodium hydroxide 30 wt % and stirred for 25 minutes at 4-10° C. in a glass reactor.

Then, a mixture of 100 ml of toluene, 20 ml of methyl ethyl ketone and 7.5 ml of methacryloyl chloride was added dropwise in 15 minutes at 4-9° C. The slurry was stirred at 4° C. for 2 hours and the product was washed with 150 ml of acetone, filtered and dried (sample 3A).

5 g of sample 3A were dissolved in DI water and purified by dialysis (MWCO 12-14 kDa), freeze dried and analyzed by 1H-NMR, showing a DS of 0.044.
Preparation 4—Guar Methacrylate (Samples 4A and 4B)

100 g of native guar gum powder were mixed with 10 g of demineralized water, 10.6 g of sodium hydroxide 30 wt %, 30 g of isopropyl alcohol and 0.15 g of N-tetrabutylammonium chloride as phase-transfer catalyst and stirred in a glass reactor for 30 minutes at a temperature of 0-4° C. Then, a mixture of 8 g of methacryloyl chloride and 20 g of isopropyl alcohol was added dropwise in 10 minutes while stirring at 0-4° C. The reaction was carried out for 2 hours at 0-4° C. The product was filtered and dried (sample 4A)

50 g of sample 4A were washed with 500 ml of acetone and dried (sample 4B).

5 g of sample 4B were dissolved in DI water and purified by dialysis (MWCO 12-14 kDa), freeze dried and analyzed by 1H-NMR, showing a DS of 0.002.
Preparation 5—Guar Crotonate (Sample 5A)

20 g of native guar gum powder were mixed with 150 ml of methyl ethyl ketone, 150 ml of demineralized water and 9.8 g of sodium hydroxide 30 wt % and stirred for 25 minutes at 0-4° C. Then, a mixture of 100 ml of toluene, 20 ml of methyl ethyl ketone and 7.5 ml of crotonyl chloride was added dropwise in 15 minutes at 0-4° C. The slurry were stirred at 0-4° C. for 2 hours and the product was washed with 150 ml of acetone and filtered (sample 5A).

5 g of sample 5A were dissolved in DI water and purified by dialysis (MWCO 12-14 kDa), freeze dried and analyzed by 1H-NMR, showing a DS of 0.028.
Preparation 6—Guar Crotonate (Samples 6A and 6B)

100 g of native guar gum powder were mixed with 10 g of demineralized water, 10.6 g of sodium hydroxide 30 wt %, 30 g of isopropyl alcohol and 0.15 g of N-tetrabutylammonium chloride as phase-transfer catalyst and stirred in a glass reactor for 30 minutes at a temperature of 0-4° C. Then, a mixture of 8 g of crotonyl chloride and 20 g of isopropyl alcohol was added dropwise in 10 minutes while stirring at 0-4° C. The reaction was carried out for 2 hours at 0-4° C. The product was filtered and dried (sample 6A) 50 g of sample 6A were washed with 500 ml of acetone and dried (sample 6B).

5 g of sample 6B were dissolved in DI water and purified by dialysis (MWCO 12-14 kDa), freeze dried and analyzed by 1H-NMR, showing a DS of $1 \cdot 10^{-3}$.
Preparation 7—Guar Silylated (Sample 7A)

100 g of native guar gum powder have been mixed with 6.4 g of sodium hydroxide 30 wt %, 20 g of isopropyl alcohol and 15.5 g of DI water in a reactor and dried to have a moisture of 3.80 wt %. 40 g of this alkalized-guar gum powder have been mixed with 250 ml of toluene in a glass reactor, 8.5 g of dimethyl vinyl chloro silane and a catalytic amount of demineralized water under nitrogen atmosphere. This mix has been stirred at a temperature of 70-80° C. for 1 hour. The product has been washed with acetone and dried (sample 7A).

5 g of sample 7A have been dissolved in DI water purified by dialysis (MWCO 12-14 kDa), freeze dried and analyzed by 1H-NMR, showing a DS of $1 \cdot 10^{-3}$.
Preparation 8—Guar Maleate (Samples 8A and 8B)

50 g of native guar gum powder were mixed with 8.2 g of sodium hydroxide 30 wt % and 20 g of isopropyl alcohol for 30 minutes at room temperature. Then, 5.0 g of maleic anhydride dissolved in 7 ml of acetone were added dropwise and stirred at 70-80° C. for 2 hours. The product was milled and dried (sample 8A).

25 g of sample 8A were washed with 250 ml of acetone and dried (sample 8B).

5 g of sample 8B were dissolved in DI water and purified by dialysis (MWCO 12-14 kDa), freeze dried and analyzed by 1H-NMR, showing a DS of 0.009.
Preparation 9—Guar Methacrylate (samples 9A and 9B)

50 g of native guar gum powder have been mixed with 4.0 g of sodium hydroxide 30 wt %, 10 g of isopropyl alcohol and 2.8 g of demineralized water for 30 minutes at room temperature. Then, a solution of 6.0 g of methacrylic anhydride in 10 g of isopropyl alcohol has been added dropwise and stirred at 70-80° C. for 2 hours.

The product has been milled and dried (sample 9A).

25 g of sample 9A have been washed with 250 ml of acetone and dried (sample 9B).

5 g of sample 9B have been dissolved in DI water purified by dialysis (MWCO 12-14 kDa), freeze dried and analyzed by 1H-NMR, showing a DS of 0.010.

Preparation 10—CMC Methacrylate (Sample 10A)

1.3 g of carboxymethyl cellulose (CMC) showing a DS of 0.76 were dissolved in 200 ml of demineralized water. Then, 5.2 g of triethylamine (TEA) were added and stirred at room temperature for 10 minutes. 7.6 g of glycidyl methacrylate (GMA) were added to the mixture and stirred for 10 minutes.

Then, 4.4 g of tetrabutylammonium bromide were added. The slurry was stirred at room temperature for 24 hours and at 60° C. for 1 hour.

Then the mixture was precipitated in acetone and washed with 2 L of acetone (sample 10A).

0.5 g of sample 10A were dissolved in DI water purified by dialysis, freeze dried and analyzed by 1H-NMR, showing a DS of 0.10.

Preparation 11—Guar Methacrylate (from GMA) (Sample 11A)

40 g of native guar gum powder have been mixed with 0.2 g of sodium hydroxide solid and 10 g of demineralized water for 10 minutes at room temperature.

Then, 1.2 g of glycidyl methacrylate (GMA) have been added dropwise and the mixture has been stirred for 10 minutes at room temperature.

Then, a solution of 0.6 g of tetrabutylammonium bromide as phase-transfer catalyst in 10 g of demineralized water has been added dropwise and stirred at room temperature for 2 hours.

Then, 0.30 g of phosphoric acid 75 wt % were added.

The product has been washed with 1 l of acetone, dried and milled (sample 11A).

5 g of sample 11A have been dissolved in DI water, purified by dialysis (MWCO 12-14 kDa), freeze dried and analyzed by 1H-NMR, showing a DS 0.004.

Preparation 12—Guar Methacrylate (from 3-Chloro-2-Hydroxypropyl Methacrylate) (Sample 12A and 12B)

800 g of native guar gum powder have been mixed with 9.32 g of sodium hydroxide solid and 200 g of demineralized water for 10 minutes at room temperature. Then, 26.8 g of 3-chloro-2-hydroxypropyl methacrylate have been added dropwise and the mixture has been stirred for 10 minutes at room temperature. Then, 160 g of demineralized water have been added dropwise and stirred at room temperature for 3 hours. Then, 9.6 g of phosphoric acid 75 wt % were added.

The product has been dried and milled (sample 12A).

25 g of the product have been washed with 250 ml of acetone, dried and milled (sample 12B).

5 g of sample 12B have been dissolved in DI water, purified by dialysis (MWCO 12-14 kDa), freeze dried and analyzed by 1H-NMR, showing a DS 0.002.

Gelation Tests in Water

Example 1

Gelation with Sample 1A 2 g of sample 1A were dissolved in 98 g of distilled water to obtain a 2 wt % aqueous solution of the modified polysaccharide. 1 ml of a 34 mM aqueous solution of the photoinitiator (Irgacure 2959, from BASF) were added to 30 g of the 2% solution of sample 1A and stirred for 10 minutes. The obtained solution was irradiated with UV light, using an Helios Italquarz Polymer 400 W lamp, for 90 seconds to obtain gelation. (GEL 1A-1)

Gelation was also obtained at room temperature mixing 30 g of the 2% solution of sample 1A with 10 g of a 9% aqueous solution of poly(ethylene glycol) diacrylate (PEGDA, Mw 700), 0.9 g of a sodium metabisulfite 1 wt % solution, 0.5 g of a 2 wt % solution of sodium persulfate and 0.4 g of an iron sulphate(II) 1 wt % solution (GEL 1A-2).

Example 2

Gelation with Samples 2A and 2B 2 g of sample 2B were dissolved in 98 g of distilled water to obtain a 2 wt % aqueous solution of the modified polysaccharide. 0.4 g of a 1 wt % aqueous solution of the photoinitiator (LFC1958 sodium salt) and 4.8 g of a 0.5 wt % aqueous solution of methylenebisacrylamide were added to 60 g of the 2% solution of sample 2B under stirring for 10 minutes. The obtained solution was irradiated with UV light, using an Helios Italquarz Polymer 400 W lamp for 90 seconds to obtain gelation (GEL 2B)

Gelation was also obtained at room temperature mixing 60 g of the 2% solution of sample 2A with 3.5 g of a 2% aqueous solution of methylenebisacrylamide, 1.7 g of a sodium metabisulfite 1 wt % solution, 1.0 g of a 2 wt % solution of sodium persulfate and 0.4 g of an iron sulphate (II) 1 wt % solution (GEL 2A-1).

Gelation was also obtained thermally mixing 60 g of the 2% solution of sample 2A with 3.5 g of a 2% aqueous solution of methylenebisacrylamide, 1.7 g of a sodium metabisulfite 1 wt % solution and 1.0 g of a 2 wt % solution of sodium persulfate at 80° C. (GEL 2A-2).

Gelation was also obtained thermally mixing 60 g of the 2 wt % solution of sample 2A with 2.5 g of a 2 wt % aqueous solution of methylenebisacrylamide and 2 g of a V-50 5 wt % solution (from WAKO Pure chemical industries) at 70° C. (GEL 2A-3).

The gels from samples 2A and 2B have been proven to be stable also at high temperature (100° C.) using a Grace Instrument M5500® viscometer for high-pressure high-temperature testing.

Example 3

Gelation with Sample 3A 0.6 g of sample 3A were dissolved in 59.4 g of distilled water to have a 1.0 wt % solution of the modified polysaccharide. 4 drops of the photoinitiator Esacure KL 200 (Lamberti Chemical Specialties) were added and stirred for 10 minutes. The obtained solution was irradiated with UV light, using an Helios Italquarz Polymer 400 W lamp for 60 seconds to obtain gelation (GEL 3A-1).

Gelation with sample 3A was also performed in the presence of methylenebisacrylamide.

0.3 g of sample 3A were dissolved in 59.7 g of distilled water to have a 0.5 wt % solution of the modified polysaccharide. 0.4 g of a 1 wt % aqueous solution of the photoinitiator (LFC1958 sodium salt) and 0.08 g of a 0.5 wt % aqueous solution of methylenebisacrylamide were added and stirred for 10 minutes. The obtained solution was irradiated with UV light, using an Helios Italquarz Polymer 400 W lamp for 60 seconds to obtain a gelation (GEL 3A-2).

Gelation with sample 3A was also performed in the presence of trimetylolpropane ethoxylated triacrylate.

30 g of a 1 wt % solution of sample 3A were mixed with 30 g of distilled water, 0.4 g of a 1 wt % aqueous solution of the photoinitiator (LFC1958 sodium salt) and 0.08 g of a 0.05 wt % aqueous dispersion of trimethylolpropane ethoxylated triacrylate (Mn 428) and stirred for 10 minutes. The obtained dispersion was irradiated with UV light, using an Helios Italquarz Polymer 400 W lamp for 60 seconds to obtain gelation (GEL 3A-3).

Gelation of sample 3A was also performed in the presence of poly(ethylene glycol) diacrylate.

30 g of a 1 wt % solution of sample 3A were mixed with 30 g of distilled water, 0.4 g of a 1 wt % aqueous solution of the photoinitiator (LFC 1958 sodium salt) and 0.03 g of a 2.5 wt % aqueous solution of poly(ethylene glycol) diacrylate (Mw 700) and stirred for 10 minutes. The obtained solution was irradiated with UV light, using an Helios Italquarz Polymer 400 W lamp for 60 seconds to obtain gelation (GEL 3A-4).

Example 4

Gelation with Samples 4A and 4B 30 g of a 1 wt % solution of sample 4B were mixed with 25 g of distilled water, 1 g of a 1 wt % aqueous solution of the photoinitiator (LFC1958 sodium salt) and 5 g of a 2.0 wt % aqueous solution of methylenebisacrylamide and stirred for 10 minutes. The obtained solution was irradiated with UV light, using an Helios Italquarz Polymer 400 W lamp for 90 seconds to obtain gelation (GEL 4B).

40 g of a 1 wt % solution of sample 4A were mixed with 10 g of distilled water, 1 g of a 1 wt % aqueous solution of the photoinitiator (LFC1958 sodium salt) and 20 g of a 2.0 wt % aqueous solution of methylenebisacrylamide and stirred for 10 minutes. The obtained solution was irradiated with UV light, using an Helios Italquarz Polymer 400 W lamp for 90 seconds to obtain gelation (GEL 4A-1).

Gelation occurred also mixing 40 g of a 1 wt % solution of sample 4A with 20 g of a 2.0 wt % aqueous solution of methylenebisacrylamide, 1.0 g of a sodium metabisulfite 1 wt % solution and 1.0 g of a 2 wt % solution of sodium persulfate at 80° C. (GEL 4A-2).

Example 5

Gelation with Sample 5A 60 g of a 1 wt % solution of sample 5A were mixed with 1 g of a 1 wt % aqueous solution of the photoinitiator (LFC3379 sodium salt) and 5 g of a 2.0 wt % aqueous solution of methylenebisacrylamide and stirred for 10 minutes. The obtained solution was irradiated with UV light, using an Helios Italquarz Polymer 400 W lamp for 90 seconds to obtain gelation (GEL 5A).

Example 6

Gelation with Sample 6B 60 g of a 1 wt % solution of sample 6B were mixed with 1 g of a 1 wt % aqueous solution of the photoinitiator (LFC3379 sodium salt) and 10 g of a 2.0 wt % aqueous solution of methylenebisacrylamide and stirred for 10 minutes.

The obtained solution was irradiated with UV light, using an Helios Italquarz Polymer 400 W lamp for 90 seconds to obtain gelation (GEL 6B).

Example 7

Gelation with Sample 7A 60 g of a 1 wt % solution of sample 7A were mixed with 1 g of a 2 wt % aqueous solution of sodium persulphate, 1 g of a 1 wt % aqueous solution of sodium metabisulphite and 20 g of a 2.0 wt % aqueous solution of methylenebisacrylamide and stirred for 10 minutes.

The mixture was heated to 80-90° C. for 5 minutes to obtain gelation (GEL 7A-1).

Gelation was also obtained by using 60 g of a 2 wt % solution in demineralized water of sample 7A mixed with 1 g of a 1 wt % aqueous solution photoinitiator (LFC3379 sodium salt) 5 g of a 2.0 wt % aqueous solution of methylenebisacrylamide and stirred for 10 minutes.

The obtained solution was irradiated with UV light, using an Helios Italquarz Polymer 400 W lamp, for 90 seconds to obtain gelation (GEL 7A-2).

Example 8

Gelation with Samples 9A and 9B 20 g of a 1 wt % solution in demineralized water of sample 9B were mixed with 10 g of a 2 wt % aqueous solution of methylenebisacrylamide, 30 g of demineralized water and 2 g of a V-50 5 wt % aqueous solution (from WAKO Pure Chemical Industries). The mixture was heated to 70-80° C. to obtain gelation (GEL 9B).

30 g of a 1 wt % solution in demineralized water of sample 9A were mixed with with 20 g of a 2 wt % aqueous solution of methylenebisacrylamide, 10 g of demineralized water and 2 g of a V-50 5 wt % solution (from WAKO Pure Chemical Industries).

The mixture was heated to 70-80° C. to obtain gelation (GEL 9A).

Example 9

Gelation with Sample 10A 30 g of a 1 wt % solution in demineralized water of sample 10A were mixed with 2 g of a 5 wt % aqueous solution of V-50 (from WAKO Pure Chemical Industries), 10 g of a 2.0 wt % aqueous solution of methylenebisacrylamide and stirred for 10 minutes.

The mixture was heated to 70° C. to obtain gelation (GEL 10A).

The conditions and results of Examples 1-9 are resumed in Table 1. Abbreviations used in Table 1:
P=modified polysaccharide
X1=crosslinker
$DS_{DB}$=double bond degree of substitution of the modified polysaccharide
In=initiator
MBA=methylenebisacrylamide
PEGDA=poly(ethylene glycol) diacrylate
TRI=trimethylolpropane ethoxylated triacrylate
pi1=photoinitiator, LFC1958 sodium salt, from Lamberti Specialties Chemicals
pi2=photoinitiator, Irgacure® 2959, from BASF pi3=photoinitiator, Esacure® KL 200 (2-hydroxy-2-methyl-1-phenyl-1-propanone, from Lamberti Chemical Specialties)
pi4=photoinitiator, LFC3379 sodium salt, from Lamberti Chemical Specialties
Rc=redox radical initiator based on sodium persulfate and sodium metabisulfite
Rc2=redox radical initiator based on sodium persulfate and sodium metabisulfite/iron sulphate(II)
V-50=thermal radical initiator, from WAKO Pure Chemical Industries
GT=gelation temperature (° C.)
GC=gelation degree, defined as follows:
1=the viscosity of the solution increases and slight gelation is observed
2=the viscosity of the solution increases a thick gel is observed
3=the viscosity of the solution increases to achieve a tongue gel
4=the viscosity of the solution increases to achieve a compact barely flowing gel
5=hyper-crosslinked gel

TABLE 1

| GEL | P | $DS_{DB}$ | % $P^{1)}$ | Xl | % $Xl^{1)}$ | In | % $In^{1)}$ | GT | Gel |
|---|---|---|---|---|---|---|---|---|---|
| 1A-1 | 1A | 0.052 | 1.93 | — | — | pi2 | 0.02 | RT | 3 |
| 1A-2 | 1A | 0.052 | 1.43 | PEGDA | 2.2 | Rc2 | 0.06 | RT | 3 |
| 2B | 2B | 0.014 | 1.84 | MBA | 0.04 | pi1 | $640^{-3}$ | RT | 4 |
| 2A-1 | 2A | 0.014 | 1.80 | MBA | 0.10 | Rc2 | 0.056 | RT | 5 |
| 2A-2 | 2A | 0.014 | 1.79 | MBA | 0.10 | Re | 0.06 | 80 | 4 |
| 2A-3 | 2A | 0.014 | 1.86 | MBA | 0.08 | V50 | 0.16 | 70 | 4 |
| 3A-1 | 3A | 0.044 | 1.00 | — | — | pi3 | 0.15 | RT | 4 |
| 3A-2 | 3A | 0.044 | 0.50 | MBA | $7*10^{-4}$ | pi1 | $7*10^{-3}$ | RT | 5 |
| 3A-3 | 3A | 0.044 | 0.50 | TRI | $7*10^{-4}$ | pi1 | $7*10^{-3}$ | RT | 5 |
| 3A-4 | 3A | 0.044 | 0.50 | PEGDA | $1*10^{-3}$ | pi1 | $7*10^{-3}$ | RT | 5 |
| 4B | 4B | 0.002 | 0.50 | MBA | 0.16 | pi1 | 0.016 | RT | 3 |
| 4A-1 | 4A | 0.002 | 0.57 | MBA | 0.57 | pi1 | 0.014 | RT | 2 |
| 4A-2 | 4A | 0.002 | 0.64 | MBA | 0.064 | Re | 0.048 | 80 | 1 |
| 5A | 5A | 0.028 | 0.91 | MBA | 0.15 | pi4 | 0.015 | RT | 3 |
| 6B | 6B | 0.001 | 0.84 | MBA | 0.28 | pi4 | 0.014 | RT | 2 |
| 7A-1 | 7A | 0.001 | 0.73 | MBA | 0.24 | Re | 0.044 | 80 | 2 |
| 7A-2 | 7A | 0.001 | 1.79 | MBA | 0.15 | pi4 | 0.015 | RT | 3 |
| 9B | 9B | 0.010 | 0.32 | MBA | 0.32 | V50 | 0.16 | 70 | 3 |
| 9A | 9A | 0.010 | 0.48 | MBA | 0.64 | V50 | 0.16 | 70 | 3 |
| 10A | 10A | 0.10 | 0.71 | MBA | 0.48 | V50 | 0.24 | 70 | 5 |

$^{1)}$wt % on the aqueous fluid

Gelation Tests in Aqueous Solutions Simulating Fracturing Fluids

Example 11

Gelation with Samples 2A and 2B in the Presence of Thiosulfate at Basic pH.

Samples 2A and 2B were used as the modified polysaccharide to gel aqueous fluid containing sodium carbonate and sodium thiosulfate, to test the effectiveness of the method in the presence of salts that are typically used in fracturing fluids, where a gelation degree of 3 or 4 is particularly desired.

The tested solutions contained 1.8% by weight of modified polysaccharide and the ingredients are detailed in Table 2.

The abbreviations used in Table 2 are the same of Table 1.

TABLE 2

| P | $Na_2CO_3^{1)}$ | $Na_2S_2O_3^{1)}$ | $MBA^{1)}$ | $In^{1)}$ | $In^{1)}$ | GT | GC |
|---|---|---|---|---|---|---|---|
| 2B | 0.17 | 0.67 | 0.15 | pi4 | 0.015 | RT | 3 |
| 2B | 0.07 | 0.29 | 0.20 | pi4 | 0.015 | RT | 3 |
| 2A | 0.15 | 0.30 | 0.11 | Rc | 0.056 | 80 | ¾ |
| 2A | 0.15 | 0.30 | 0.10 | Rc2 | 0.057 | RT | 3 |
| 2A | 0.15 | 0.31 | 0.08 | V50 | 0.15 | 81 | ¾ |

$^{1)}$wt % on the fracturing fluid

Example 12

Gelation with Sample 11A in the Presence of Potassium Chloride and Sodium Thiosulfate.

20 g of a 1.0 wt % solution in demineralized water of sample 11A were mixed with 17.5 g of demineralized water, 0.6 g of potassium chloride (as clay stabilizer), 0.25 g of a 30 wt % aqueous solution of sodium thiosulfate (as gel stabilizer), 1 g of a 5 wt % aqueous solution of V-50 (from WAKO Pure Chemical Industries), 1.5 g of a 2.0 wt % aqueous solution of methylenebisacrylamide and stirred for 10 minutes.

The mixture was heated to 58° C. to obtain gelation (GEL 11A-1). GEL 11A-1 has been proven to be stable also at high temperature (2 hours at 120° C.) using a Grace Instrument M5500® viscometer for high-pressure high-temperature testing Example 13

Gelation with Sample 11A in the Presence of Potassium Chloride.

30 g of a 1.0 wt % solution in demineralized water of sample 11A were mixed with 11 g of demineralized water, 0.6 g of potassium chloride (as clay stabilizer), 0.1 g of a 5 wt % aqueous solution of sodium sulfite, 1.5 g of a 2.0 wt % aqueous solution of methylenebisacrylamide and stirred for 10 minutes.

The mixture was heated to 45° C. to obtain gelation (GEL 11A-2). GEL 11A-2 has been proven to be stable also at high temperature (80° C.) using a Grace Instrument M5500® viscometer for high-pressure high-temperature testing

Example 14

Gelation with Sample 11A in an Aqueous Solution Simulating Fracturing Fluid Based on Production Water.

30 g of a 0.5 wt % solution in simulated produced water (composition described in Table 3) of sample 11A were mixed with 0.1 g of a 5 wt % aqueous solution of sodium sulfite, 1.0 g of a 2.0 wt % aqueous solution of methylenebisacrylamide and stirred for 10 minutes.

The mixture was heated to 40° C. to obtain gelation (GEL 11A-3). GEL 11A-3 has been proven to be stable also at high temperature (80° C.) using a Grace Instrument M5500® viscometer for high-pressure high-temperature testing

TABLE 3

Simulated production water composition

| Component | wt % |
|---|---|
| Sodium chloride | 13 |
| Calcium chloride | 3 |
| Magnesium chloride hexahydrate | 0.85 |
| Potassium chloride | 0.1 |
| Sodium sulfate | 0.03 |
| Sodium bicarbonate | 0.02 |
| Demineralized water | 83 |

Example 15

Gelation with Sample 12A in an Aqueous Solution Simulating Fracturing Fluid Based on Production Water.

30 g of a 0.5 wt % solution in simulated produced water (composition described in Table 3) of sample 12A were mixed with 0.1 g of a 5 wt % aqueous solution of sodium metabisulfite, 0.3 g of a 2.0 wt % aqueous solution of methylenebisacrylamide and stirred for 10 minutes.

The mixture was heated to 40° C. to obtain gelation (GEL 12A-1).

GEL 12A-1 has been proven to be stable also at high temperature (80° C.) using a Grace Instrument M5500® viscometer for high-pressure high-temperature testing

Example 16

Gelation with Sample 12B in an Aqueous Solution Simulating Fracturing Fluid Based on Production Water.

30 g of a 0.5 wt % solution in simulated produced water (composition described in Table 3) of sample 12B were mixed with 0.1 g of a 5 wt % aqueous solution of sodium metabisulfite, 0.3 g of a 2.0 wt % aqueous solution of methylenebisacrylamide and stirred for 10 minutes.

The mixture was heated to 40° C. to obtain gelation (GEL 12B).

GEL 12B has been proven to be stable also at high temperature (80° C.) using a Grace Instrument M5500® viscometer for high-pressure high-temperature testing.

Example 17

Gelation with Sample 11A in an Aqueous Solution Simulating a Fracturing Fluid Based on Production Water in the Presence of a Phosphonate-Based Scale Inhibitor.

30 g of a 0.5 wt % solution in simulated produced water (composition described in Table 3) of sample 11A were mixed with 0.1 g of a 5 wt % aqueous solution of sodium metabisulfite, 0.5 g of a phosphonate-based non-diluted commercial scale inhibitor (CST-68521 sold by CST ppc, USA), 1.5 g of a 2.0 wt % aqueous solution of methylenebisacrylamide and stirred for 10 minutes.

The mixture was heated to 30° C. to obtain gelation (GEL 11A-4).

Example 18

Gelation with Sample 12A in an Aqueous Solution Simulating a Fracturing Fluid Based on Production Water in the Presence of Hard-Burned Magnesium Oxide.

30 g of a 0.33 wt % solution in simulated produced water (composition described in Table 3) of sample 12A were mixed with 0.4 g of a 5 wt % aqueous solution of sodium metabisulfite, 0.24 g of a 30 wt % aqueous solution of sodium thiosulfate (as gel stabilizer), 1.5 g of a 2.0 wt % aqueous solution of methylenebisacrylamide and 0.4 g of a mineral oil suspension of hard-burned magnesium oxide (17 wt % active; a slow-release base is added to raise pH above 7 only after crosslinking and thus allow sodium thiosulfate to effectively prevent gel degradation at high temperatures) and stirred for 10 minutes.

The mixture was heated to 64° C. to obtain gelation (GEL 12A-2); pH before gelation was 5.3; after gelation pH was measured to be 8.3; therefore pH has been raised during heating without interfering with radical release and crosslinking reaction.

The conditions and results of Examples 12-18 are detailed in Table 4.

In Table 4:
Rc3=radical initiator based on sodium sulfite
Rc4=radical initiator based on sodium metabisulfite
The other abbreviations used in Table 4 are the same of Table 1.

TABLE 4

Examples 12-18

| Ex. | P | $DS_{DB}$ | % P[1] | Xl | % Xl[1] | In | % In[1] | GT | Gel |
|---|---|---|---|---|---|---|---|---|---|
| 12 | 11A | 0.004 | 0.49 | MBA | 0.07 | V50 | 0.12 | 58 | 4 |
| 13 | 11A | 0.004 | 0.69 | MBA | 0.07 | Rc3 | 0.01 | 45 | 4 |
| 14 | 11A | 0.004 | 0.48 | MBA | 0.06 | Rc3 | 0.02 | 40 | 4 |
| 15 | 12A | 0.002 | 0.49 | MBA | 0.02 | Rc4 | 0.02 | 40 | 4 |
| 16 | 12B | 0.002 | 0.49 | MBA | 0.02 | Rc4 | 0.02 | 40 | 4 |
| 17 | 11A | 0.004 | 0.47 | MBA | 0.09 | Rc4 | 0.02 | 30 | 4 |
| 18 | 12A | 0.002 | 0.31 | MBA | 0.09 | Rc4 | 0.06 | 64 | 3 |

The invention claimed is:

1. A method for treating a portion of a subterranean formation comprising:
   i. providing an aqueous fluid comprising:
      a) from 0.05 to 3.0% by weight of a modified polysaccharide, the modified polysaccharide being a polysaccharide bearing ethylenically unsaturated double bonds, with the double bonds having a degree of substitution (DSDB) of from 0.0001 to 0.5, wherein the modified polysaccharide is formed by reaction with an unsaturated acyl halide, or anhydride, or ester, or acid, or silane, or epoxide bearing an ethylenically unsaturated double bond;
      b) from 0 to 3.0% by weight of a polyethylenically unsaturated compound different from the modified polysaccharide a);
      c) from 0.0001% to 1% by weight of a radical polymerization initiator chosen from the group consisting of photoinitiators, thermal free radical initiators, redox free radical initiators, and combinations thereof;

ii. introducing the aqueous fluid into a portion of a subterranean formation by pumping or injecting the fluid at a pressure sufficient to fracture the subterranean formation; and iii. before or after having introduced the aqueous fluid into a portion of a subterranean formation, inducing thickening of the aqueous fluid by exposing the fluid to UV-visible light irradiation or to heat.

2. The method of claim 1 wherein the modified polysaccharide a) is selected from the group consisting of a modified polygalactomannan, a modified polygalactomannan derivative, and a modified cellulose ether.

3. The method of claim 2 wherein the modified polysaccharide a) is a modified polygalactomannan.

4. The method of claim 3 wherein the modified polygalactomannan is a modified guar.

5. The method of claim 4 wherein the modified guar is a guar (meth)acrylate.

6. The method of claim 1 wherein the modified polysaccharide is carboxymethyl cellulose.

7. The method of claim 1 wherein the polyethylenically unsaturated compound is methylenebisacrylamide.

8. The method of claim 1 wherein the radical polymerization initiator is a photoinitiator and the thickening of the aqueous fluid is induced by exposing the fluid to UV-visible light irradiation.

9. The method of claim 1 wherein the radical polymerization initiator is a thermal or redox radical initiator and the thickening of the aqueous fluid is induced by exposing the fluid to heat.

10. The method of claim 1, wherein the aqueous fluid is an aqueous fracturing fluid.

11. The method of claim 1 wherein the modified polysaccharide has a DSDB of from 0.001 to 0.03.

12. The method of claim 1 wherein the modified polysaccharide has a DSDB of from 0.01 to 0.03.

13. The method of claim 1 wherein the inducing of the thickening of the aqueous fluid is performed by irradiating the fluid with UV-visible light.

14. The method of claim 1 wherein from about 0.01 to about 1 wt % of the polyethylenically unsaturated compound is contained in the aqueous fluid.

15. The method of claim 14 wherein from about 0.05 to about 0.5 wt % of the polyethylenically unsaturated compound is contained in the aqueous fluid.

16. The method of claim 1 wherein the aqueous fluid has a pH equal to or less than 8.

17. The method of claim 16 wherein the aqueous fluid has a pH equal to or less than 7.

18. The method of claim 1 wherein the aqueous fluid is prepared using produced oilfield water.

19. The method of claim 1 wherein the radical polymerization initiator is a free radical initiator selected from the group consisting of sodium sulfite, sodium bisulfite, sodium metabisulfite and combinations thereof.

20. The method of claim 1 wherein the radical polymerization initiator is a water soluble thermal azo-initiator selected from the group consisting of: 4,4'-azobis(4-cyanopentanoic acid), 2,2'-azobis(2-methylpropionamidine)dihydrochloride (V-50), 2,2'-azobisisobutyronitrile (AIBN) and combinations thereof.

* * * * *